(12) United States Patent
Zhang et al.

(10) Patent No.: US 10,278,109 B2
(45) Date of Patent: Apr. 30, 2019

(54) METHOD OF 5G/WLAN VERTICAL HANDOVER BASED ON FUZZY LOGIC CONTROL

(71) Applicant: Chongqing University of Posts and Telecommunications, Chongqing (CN)

(72) Inventors: Zhizhong Zhang, Chongqing (CN); Li Yu, Chongqing (CN); Fang Cheng, Chongqing (CN); Haonan Hu, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 116 days.

(21) Appl. No.: 15/453,871

(22) Filed: Mar. 8, 2017

(65) Prior Publication Data

US 2017/0181052 A1    Jun. 22, 2017

Related U.S. Application Data

(63) Continuation-in-part of application No. PCT/CN2014/086168, filed on Sep. 9, 2014.

(51) Int. Cl.
*H04W 16/32* (2009.01)
*H04W 36/00* (2009.01)
*H04W 36/08* (2009.01)
*H04W 36/14* (2009.01)
*H04W 36/26* (2009.01)
(Continued)

(52) U.S. Cl.
CPC ..... *H04W 36/38* (2013.01); *H04W 36/00837* (2018.08); *H04W 36/08* (2013.01); *H04W 36/26* (2013.01); *H04W 48/16* (2013.01); *H04W 16/32* (2013.01); *H04W 36/14* (2013.01); *H04W 84/12* (2013.01); *H04W 92/045* (2013.01)

(58) Field of Classification Search
CPC ..... H04W 36/08; H04W 36/26; H04W 36/38; H04W 48/16
See application file for complete search history.

(56) References Cited

U.S. PATENT DOCUMENTS

| | | | |
|---|---|---|---|
| 2007/0115899 A1* | 5/2007 | Ovadia | H04W 36/24 370/338 |
| 2012/0257598 A1* | 10/2012 | Karampatsis | H04W 8/082 370/331 |
| 2015/0017985 A1* | 1/2015 | Safavi | H04W 36/0083 455/436 |

* cited by examiner

*Primary Examiner* — Derrick W Ferris
*Assistant Examiner* — Farhad Ali
(74) *Attorney, Agent, or Firm* — Matthias Scholl P.C.; Matthias Scholl

(57) ABSTRACT

A method of 5G/WLAN vertical handover based on fuzzy logic control, the method including: 1) obtaining, by a mobile node, dynamic access-network information from a database of access network discovery and selection function; 2) from the obtained dynamic access-network information, sorting out and selecting an RSS, an available bandwidth, and a degree of user's preference for WLAN as performance parameters, and monitoring a real-time status of networks; 3) when the real-time status of the networks satisfies mandatory user-defined rules, executing a typical handover directly according to the user-defined rules; when the real-time status of the networks does not satisfy mandatory user-defined rules, triggering a vertical handover-decision procedure based on a fuzz logic mode; and 4) conducting adjustment and control, by the MN, by dynamically updating access-network information, changing rules and varying membership functions.

2 Claims, 5 Drawing Sheets

(51) Int. Cl.
*H04W 36/38* (2009.01)
*H04W 48/16* (2009.01)
*H04W 84/12* (2009.01)
*H04W 92/04* (2009.01)

METHOD OF 5G/WLAN VERTICAL HANDOVER BASED ON FUZZY LOGIC CONTROL

CROSS-REFERENCE TO RELATED APPLICATIONS

This application is a continuation-in-part of International Patent Application No. PCT/CN2014/086168 with an international filing date of Sep. 9, 2014, designating the United States, now pending, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method of 5G/WLAN vertical handover (VHO) based on fuzzy logic control.

Description of the Related Art

Nowadays, with large-scale deployment of 4G (Fourth-generation Mobile Communication) network and release of 4G licenses, 5G network (Fifth-generation Mobile Communication) research has gradually come into focus.

There are three technical roadmaps for 5G network: LTE/LTE-A advanced evolution, next-generation WLAN, and revolutionary new technologies. Considering the existing networks, equipment and resources, 5G network is most likely to constantly evolve based on the existing network architectures and towards flattening expansion and enhancement. Through dense deployment and synergic integration of cellular networks having different coverage, network capacity and access transmission speed can be improved, thus, spectral efficiency per unit area and QoS (Quality of Service) can be increased.

Although a 5G system can provide high coverage and good continuity, there still exist dead zones; meanwhile, with increased number of users and hence interference, cell coverage area will be reduced, resulting in insufficient capacity in hotspots. Whereas WLAN can provide seamless coverage in enterprises, homes and hotspots. As a complement to 5G, WLAN can be advantageously utilized to address indoor networking requirements in hotspots, so that mobile communication network can be improved.

Traditional handover (HO) decision-making is based on a unique reference metric—RSS (received signal strength), however, VHO in 5G/WLAN heterogeneous networks requires more metrics for decision-making, leading to more complicated HO decision algorithm and difficulties in mathematical modeling.

SUMMARY OF THE INVENTION

In view of the above-described problems, it is one objective of the invention to provide a method of 5G/WLAN vertical handover (VHO) based on fuzzy logic control. The method evaluates three factors, namely, received signal strength of a mobile node (MN), network bandwidth and degree of user's preference in synthesis to select an optimal network to which HO is performed.

In the method of 5G/WLAN vertical handover (VHO) based on the fuzzy logic control of the invention, by building a fuzzy logic controller on a MN, and through synthesis-evaluation of the MN's state with a fuzzy logic control system according to different input information and different number of determination factors, HO is performed on the user terminal to the most suitable access network. Specifically, the method comprises the following steps:

1) obtaining, by a mobile node (MN), dynamic access-network information from a database of access network discovery and selection function (ANDSF), wherein the dynamic access-network information is obtained from interaction of ANDSF with HSS (home subscriber register) through a newly added interface S0 between ANDSF and HSS;

2) from the obtained dynamic access-network information, sorting out and selecting an RSS, an available bandwidth, and a degree of user's preference for WLAN as performance parameters, and monitoring a real-time status of networks;

3) when the real-time status of the networks satisfies mandatory user-defined rules, executing a typical handover (HO) directly according to the user-defined rules; when the real-time status of the networks does not satisfy mandatory user-defined rules, triggering a VHO-decision procedure based on a fuzz logic mode:

3.1) inputting real-time collected performance parameters into a fuzzification module for fuzzification processing: defining domains ranging from 0 to 1 for the RSS, the available bandwidth, and the degree of UF, respectively, defining three fuzzy subsets over each of the domains, and converting input exact values into fuzzy variable values represented by membership functions;

3.2) performing, by a fuzzification inference module, multi-aspect evaluation of the three fuzzy subsets according to "If . . . Then . . . " fuzzy rules to obtain an aggregation of fuzzy-decision outputs; and 3.3) converting, by a defuzzification module, the aggregation of fuzzy-decision outputs into a certain numeric value according to a defuzzification formula, and comparing the certain numeric value with a previously obtained threshold, determining to which candidate access network the handover is to be performed to accomplish one-time of HO procedure; and 4) conducting adjustment and control, by the MN, by dynamically updating access-network information, changing rules and varying membership functions, thus accomplishing multi-times of HO.

In a class of this embodiment, the RSS, available bandwidth, and degree of UF are respectively defined as a domain ranging from 0 to 1, with three fuzzy subsets defined over the domains respectively: for RSS, "0" in the domain indicates that the received signal strength at the receiver end is less than or equal to the minimum threshold, "1" in the domain indicates that the received signal strength is greater than or equal to the maximum threshold, and "0.5" is for the rest cases; for available bandwidth, "0" indicates that the available bandwidth is less than or equal to Min(i), "1" indicates that the available bandwidth is greater than or equal to Max(i), and "0.5" is for the rest cases; and for degree of UF, "0" indicates that the WLAN is not to be chosen by the user in any cases, "1" indicates that the WLAN is favored by the user, and "0.5" indicates a normal degree of favor.

In a class of this embodiment, the defuzzification module converts the fuzzy outputs into a certain numeric value according to a defuzzification formula, and the defuzzification process employs a center-of-gravity approach and generates an output as follows:

$$\text{out} = \frac{\sum_{j=1}^{27}\left(\text{output}_j \prod_{i=1}^{3} u_{ij}\right)}{\sum_{j=1}^{27}\left(\sum_{i=1}^{3} u_{ij}\right)}$$

where, $\text{output}_j$ is an output of a jth rule, $u_{ij}$ is an ith degree of membership of the jth rule.

The invention proposes an integrated 5G/WLAN network architecture. Base on Nanocell architecture proposed by China Mobile, integration and interoperability between 5G network and WLAN can be achieved by increasing network entities in access networks. The integration of 5G network and WLAN is a development trend of the next-generation mobile communication, and the key for solving the integration problem is to achieve a seamless VHO between the two heterogeneous networks (i.e. 5G/WLAN) and at the same time keep uninterrupted service on an MN during intercell HO and guarantee quality of service.

The VHO procedure of the invention comprises three stages:

1) collection of needed information for HO: all dynamic access-network information is collected to determine whether intercell HO is required.

2) HO decision: it is divided into HO initiation and network selection. The two substages indicate that an HO is initiated at an appropriate time and a most suitable access network is selected according to a decision algorithm.

3) HO execution: it refers to channel change, resource allocation, etc., during changing from one network to another network.

Advantages of the method of 5G/WLAN vertical handover (VHO) based on the fuzzy logic control according to embodiments of the invention are summarized as follows:

The main idea of the method of the invention is to achieve control of a system, to which a mathematical model is hard to develop, through imitation of human's logic thoughts. Application of a fuzz-logic based control algorithm to a VHO decision can satisfyingly solve the HO decision-making problem in a multi-network coverage scenario. 5G network research is still in its infancy, whereas WLAN is constantly evolving forward, such as high efficient WLAN (HEW), hence there is great uncertainty in integration of the both networks, therefore, when an MN is located in a common coverage area of the two networks, an inter-network HO may occur. The fuzzy-logic based VHO algorithm is advantageous in that it can deal with such uncertain information, and thus can solve aforementioned technical problems, that is, difficulties in development of a mathematical model and complicated HO decision.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method of 5G/WLAN vertical handover based on fuzzy logic control are described below. It should be noted that the following examples are intended to describe and not to limit the invention.

Figure 1:
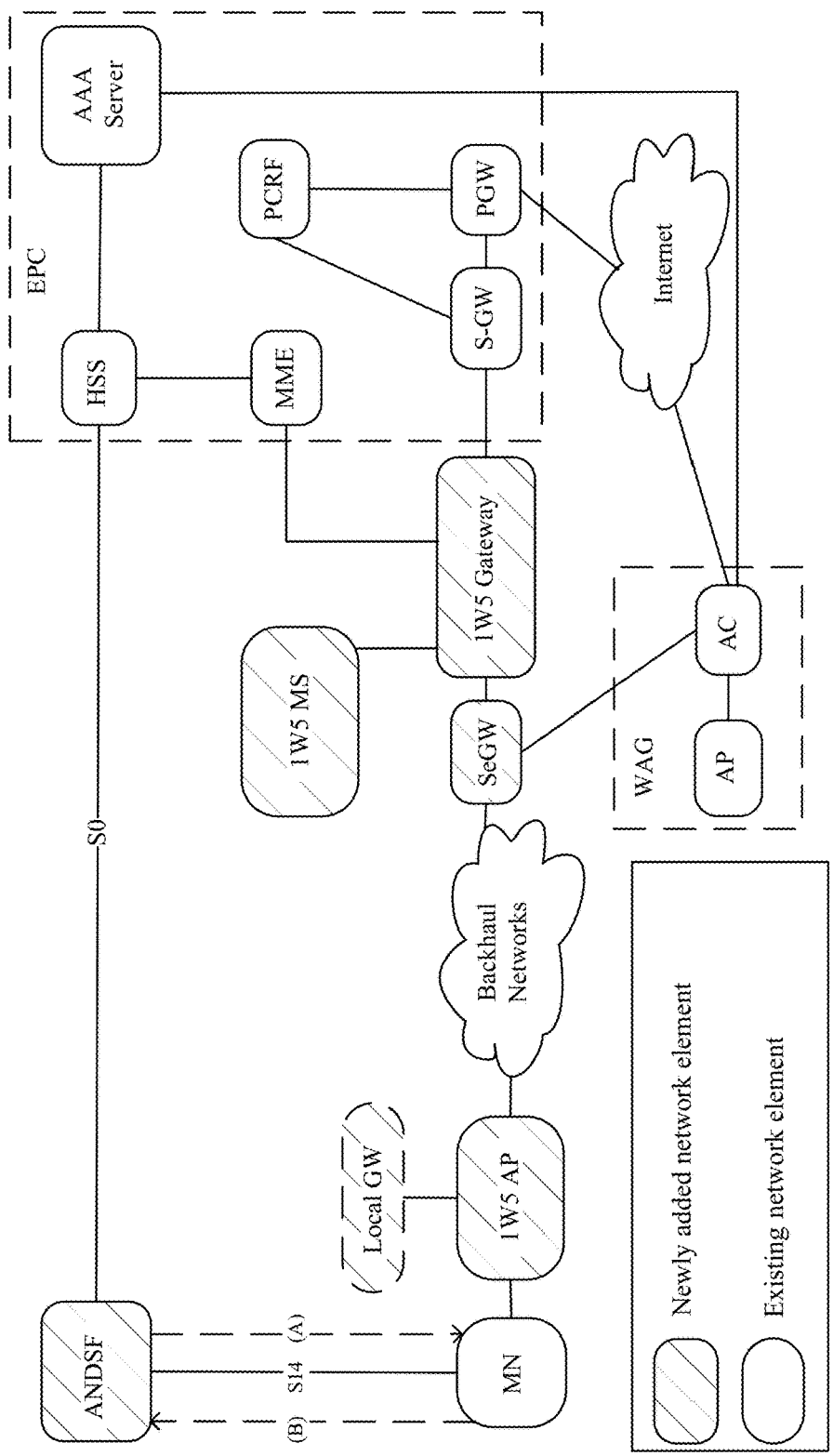
FIG. 1 illustrates an integrated 5G/WLAN network architecture and deployment of ANDSF.

As shown in FIG. 1, the invention is applicable for a VHO scenario in integrated 5G/WLAN networks, and the integrated network architecture enables an MN to easily obtain dynamic access-network information and is composed of three parts: an EPC (Evolved Packet Core) core network, an access part (WAG, Wireless Access Gateway) of a traditional WLAN, and a newly added network element (NE). Among them, architectures and networking techniques for access control of the EPC core network and WLAN follow the architectures and functionality of the existing systems.

Below, the functions of the newly added NE will be described.

IW5 AP (integration of WLAN/5G, hereinafter referred to as IW5) provides cellular-network access to a terminal, and communicates with the terminal through the air interface Uu. It also provides WLAN access, and communicates with the terminal through a WLAN module. IW5 APs can be aggregated by a local aggregator.

Local GW, which is an optional function of the IW5 AP, can route forward a user's data through a local network and access IP resources cached in the local network, thus reducing the amount of IP packets to be transmitted to the core network and reducing load of the core network. Content storage and delivery capability will sink to the access network, and feed contents based on analysis of users' demands, thus enhancing user's experience in business.

IW5 GW performs mutual authentication between AP devices; Signaling messages and data at the S1 interface and messages between AP and network management system are encrypted by IPSec; In the case that a large number of IW5 Aps exist, an integration gateway can perform aggregation in the signaling plane at the S1 interface according to configurations, thus reducing signaling load of Mobility Management Entity (MME).

IW5 MS, which is used to manage IW5 AP and IW5 GW, has its parameters configured upon AP's start-up, and implements AP performance management (interactive load information) during operation. AP has a list, and MS is responsible for establishing and maintaining the list, MS also collects relevant information and compares the information with the existing information in the list (to prevent a rogue access point). The management server is also responsible for dominating and coordinating a handover procedure, thus preventing reliance on access of an AP to dominate a handover procedure.

When a MN moves at a constant speed in 5G/WLAN integrated networks as shown in FIG. 1, as the MN exits 5G network and enters into a hotspot area of WLAN, VHO between the heterogeneous networks will occur; whether and when to perform HO is determined according to the collected performance parameters. Of course, how to obtain these performances is one problem that should be firstly solved.

In order to enable the network to send access-network information to the MN, for the terminal to implement network discovery and selection, ANDSF has been introduced and discussed in detail in the standards "3GPP TS 24.312 (Release 10)". The standards "3GPP Release 12/13" still use the concept "ANDSF", and it can be used for integration and interoperability of 5G and WLAN networks. The invention provides an approach for dynamically updating the access-network-information database of ANDSF, wherein an S0 interface is added between ANDSF and HSS to enable ANDSF to obtain user information within a certain area under current coverage.

UE interacts with ANDSF through the S14 interface. The S14 interface transmits three types of network-discovery-and-selection policies, namely, ISMP (Inter-System Mobility Policy), AND (Access Network Discovery) information and ISRP (Inter-System Routing Policy). ANDSF has pre-stored access-network information collected in a certain geographic area in its access-network database; when the MN requests access-network information from ANDSF, ANDSF returns static information which cannot be guaranteed in reliability (for example, due to failure of some access points, or access points being no longer suitable for new user's access due to too many users and too much load), the MN needs to scan the obtained access networks to acquire useful information, resulting in increased handover latency and increased power consumption of the user's device. Considering the above factors, it is necessary to dynamically update the information in the database of ANDSF, and the invention proposes a novel approach for that.

Firstly, ANDSF dynamically updates its access network information database, then, based on the acquired information, evaluates availability ratings of the access networks; the specific procedure is as follows:

1) based on a preset cycle period, upon expiration of the period, firstly ANDSF queries HSS through the S0 interface for user information in the area covered by the current access network, and chooses one available MN as the source of information;

2) ANDSF sends access-network information query requests through the S14 interface to the chosen MN;

3) after receiving the access network information query request, and according to the type of the access network, the MN opens a physical interface to scan the access networks, to acquire current availability information of the access networks, such as, accessibility and load information of the access networks, etc.;

4) the MN sends the access-network availability information back to ANDSF, and according to the information, ANDSF evaluates availability ratings of the access networks and starts timing of the next cycle period. In this way, ANDSF can obtain dynamic information of candidate access networks in a certain area, such as network link quality, bandwidth, battery level, mobility speed and user preferences, etc.

Figure 2:
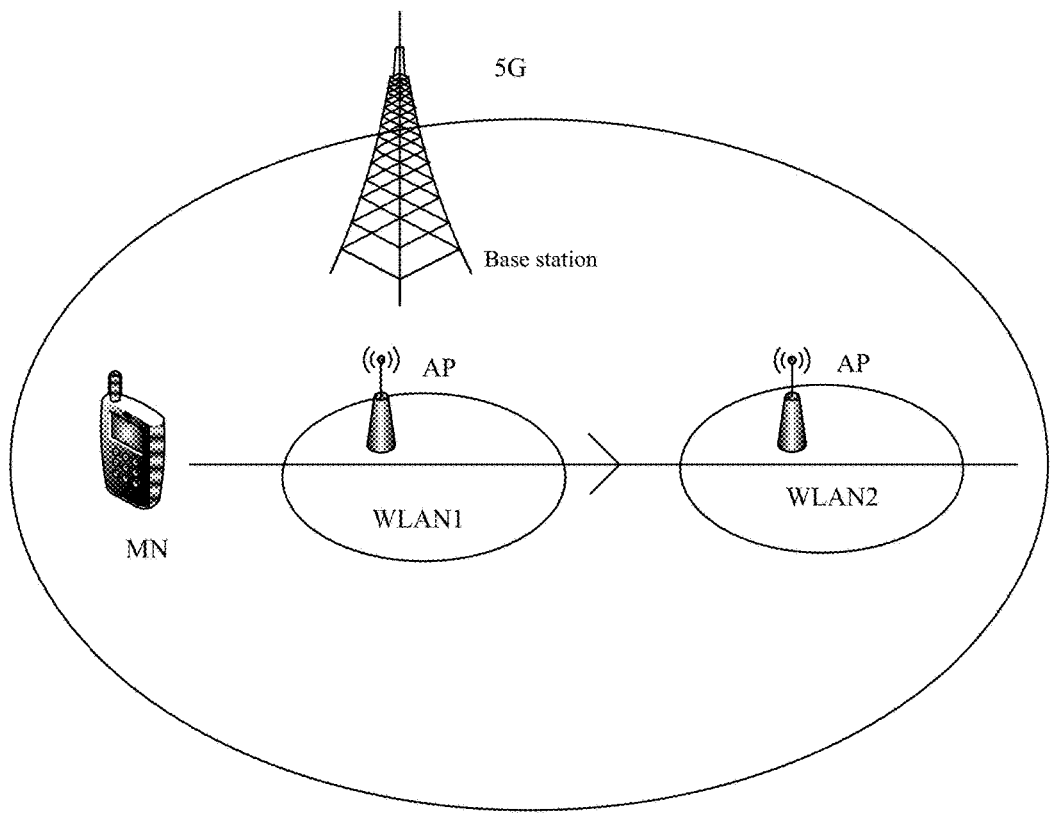
FIG. 2 depicts a 5G/WLAN VHO scenario in accordance with the one embodiment of the invention.

As shown in FIG. 2, FIG. 2 depicts a VHO scenario under common coverage of 5G and WLAN in accordance with the invention. In the future, there will be tremendous coverage of 5G network, therefore, assuming that a MN is always within a coverage area of 5G network and 5G network signals always exist, the MN can successfully execute HO from WLAN to 5G network at any time, thus the VHO decision problem becomes an issue whether a user in 5G network needs handover to WLAN. When a user moves in 5G/WLAN mixed networks, he will move across multiple WLANs; as he enters a WLAN, a MN may choose WLAN to access services, also may not choose WLAN but keep using 5G network to access services; as the user exits WLAN, he must select 5G network to access services.

Figure 3A:
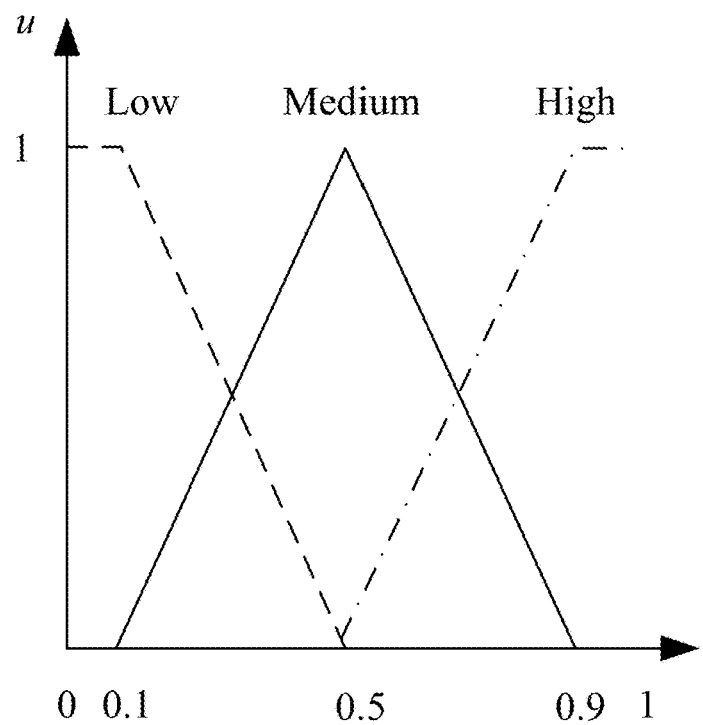
FIG. 3A illustrates a membership function of RSS in accordance with one embodiment of the invention.
Figure 3B:
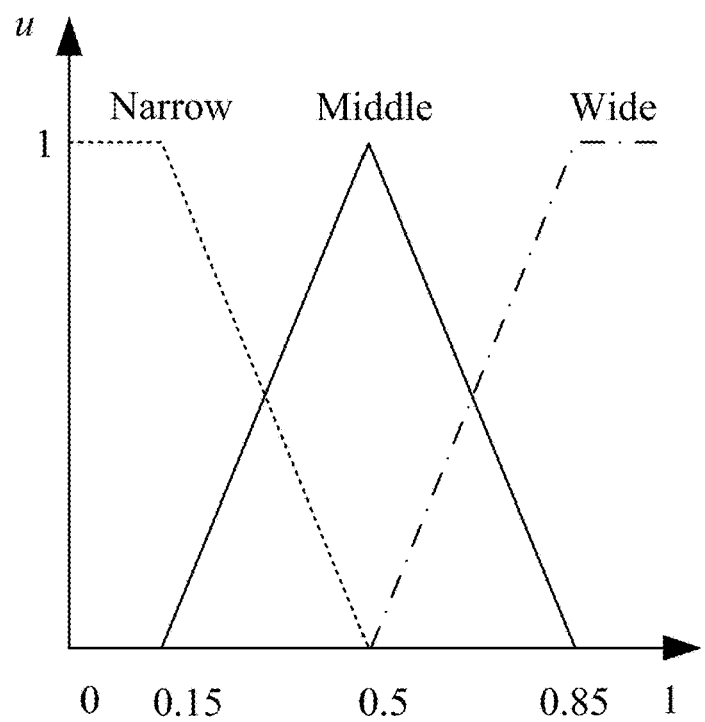
FIG. 3B illustrates a membership function of an available bandwidth in accordance with one embodiment of the invention.
Figure 3C:
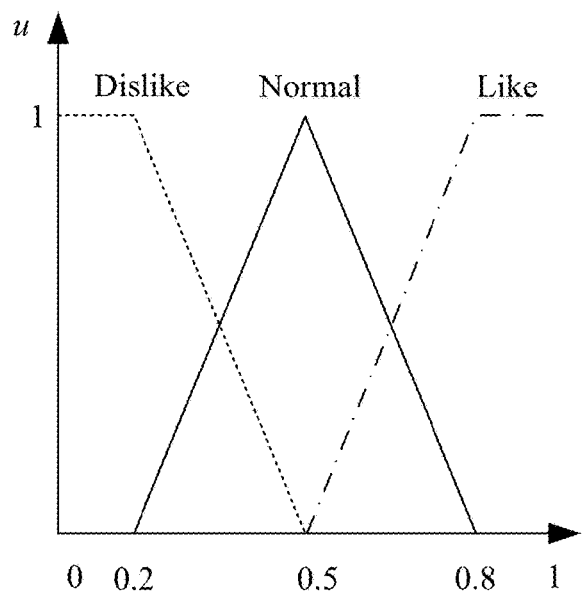
FIG. 3C illustrates a membership function of a degree of user's preference for WLAN in accordance with one embodiment of the invention.

FIGS. 3A-3C shows diagrams of membership functions for the Qos-related influencing factors adopted in the invention, in which Qos is determined by multi-aspect factors: RSS, bandwidth, cost, power consumption and other-aspect factors, each factor has different Qos-influencing index. For simplicity, only two variables—RSS and bandwidth—and degree of UF for WLAN are selected as factors to be considered in HO decision.

Firstly, a fuzzy logic approach is utilized for information fuzzification processing: the RSS, available bandwidth, and degree of UF are respectively defined as a domain ranging from 0 to 1. starting_input(i) denotes an initial value of an HO variable i, and input(i) denotes the converted value of starting_input(i) in the domain. Min(i) represents the minimum threshold of the variable i, and for RSS, only when the initial input value is greater than the minimum threshold, can a fuzzy-logic based VHO procedure be triggered; For available bandwidth, it represents the minimum access bandwidth that can be received by users; For degree of UF for WLAN, it represents dislike of WLAN. For all the three input variables, Max(i) represents the opposite of what Min(i) represents. For RSS, "0" in the domain indicates that the received signal strength at the receiver end is less than or equal to the minimum threshold, "1" in the domain indicates that the received signal strength is greater than or equal to the maximum threshold, and "0.5" is for the rest cases. For available bandwidth, "0" indicates that the available bandwidth is less than or equal to Min(i), "1" indicates that the available bandwidth is greater than or equal to Max(i), and "0.5" is for the rest cases; For degree of UF, "0" indicates that the WLAN is not to be chosen by the user in any cases, "1" indicates that the WLAN is favored by the user and will choose WLAN as long as a WLAN exists and can provide minimum quality of service, and "0.5" indicates a normal degree of favor. For a numeric value between the minimum and the maximum value, it is converted into the domain by using the following Equation:

$$\text{input}(i) = \frac{\text{starting\_input}(i) - \text{Min}(i)}{\text{Max}(i) - \text{Min}(i)} \quad (1)$$

where i represents RSS, available bandwidth, and degree of UF.

Then, depending on membership functions for the respective input parameters, the three input parameters are mapped into three fuzzy logic variables respectively, and each of the fuzzy logic variables (decision parameters) are converted into one fuzzy subset and input into a fuzzy inference module, in which the three fuzzy subsets are Low, Medium, High; Narrow, Middle, Wide; and Dislike, Normal, Like.

Figure 4:
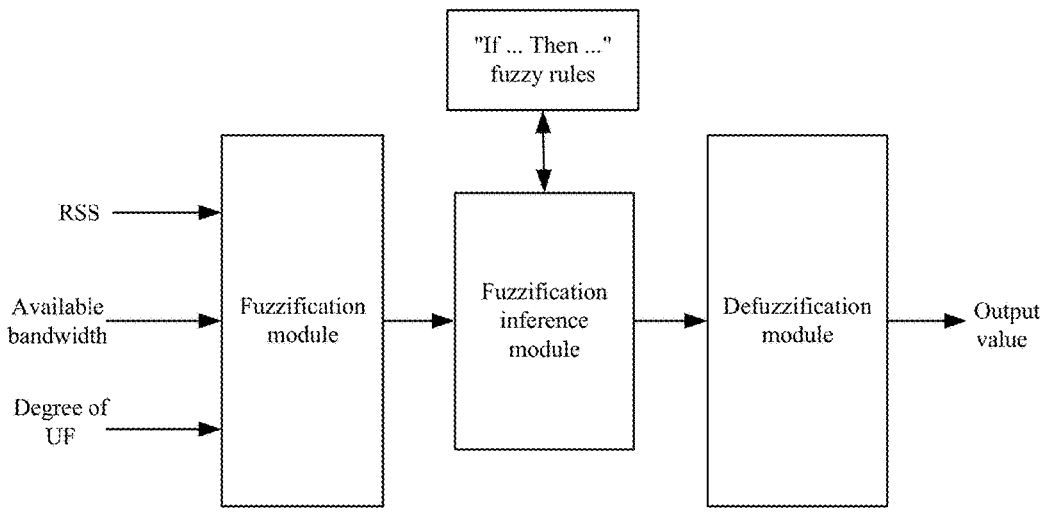
FIG. 4 is a schematic block diagram of a fuzzy-logic-controller based system provided by the method in accordance with the one embodiment of the invention.

FIG. 4 is a schematic block diagram of a fuzzy-logic-controller based system provided by the invention, in which each fuzzy logic controller is composed of three basic parts: a fuzzification module, a fuzzy inference module and a defuzzification module. Firstly, a fuzzy logic approach is utilized by the fuzzification module for information fuzzification processing: the RSS, available bandwidth, and degree of UF are respectively defined as a domain ranging from 0 to 1, with three fuzzy subsets defined over the domains respectively: for RSS, the three fuzzy subsets are Low, Medium, High; for available bandwidth, likewise, the system also defines three fuzzy subsets: Narrow, Middle, Wide; For degree of UF for WLAN, the three fuzzy subsets are defined as Dislike, Normal, Like, and membership functions used for the three subsets are derived from empiric values, so, an input exact value is converted into a fuzzy variable value represented by membership function.

The fuzzy inference module performs multi-aspect evaluation of the input fuzzy subsets according to "If . . . Then . . . " fuzzy rules, and thus obtains an aggregation of fuzzy-decision outputs. Because the invention defines three fuzzy variables and three different fuzzy sets "low", "medium" and "high", the number of fuzzy rules is up to 3$^3$=27. The invention employs a Sugeno-type fuzzy control system, which determines the fuzzy-rule outputs as a certain numeric value. The larger the numeric value is, the higher degree of membership to the current AP the MN has; the smaller the numeric value is, the lower degree of membership the MN has. The invention classifies the 27 rules into 9 cases, and the specific fuzzy rules are described as below:

If RSS=L and B=W and Favor=L, then output is 1,
If RSS=L and B=M and Favor=L, then output is 2,
. . .
If RSS=H and B=N and Favor=D, then output is 9.

The defuzzification module converts the fuzzy outputs into a certain numeric value according to a defuzzification formula, since the fuzzy-rule inferred outputs are fuzzy quantities. There are many defuzzification approaches, and the invention employs a center-of-gravity defuzzification approach, and the defuzzification formula is as follows:

$$out = \frac{\sum_{j=1}^{27}\left(output_j \prod_{i=1}^{3} u_{ij}\right)}{\sum_{j=1}^{27}\left(\sum_{i=1}^{3} u_{ij}\right)} \quad (2)$$

where, $output_j$ is an output of a jth rule, $u_{ij}$ is an ith degree of membership of the jth rule.

Figure 5:
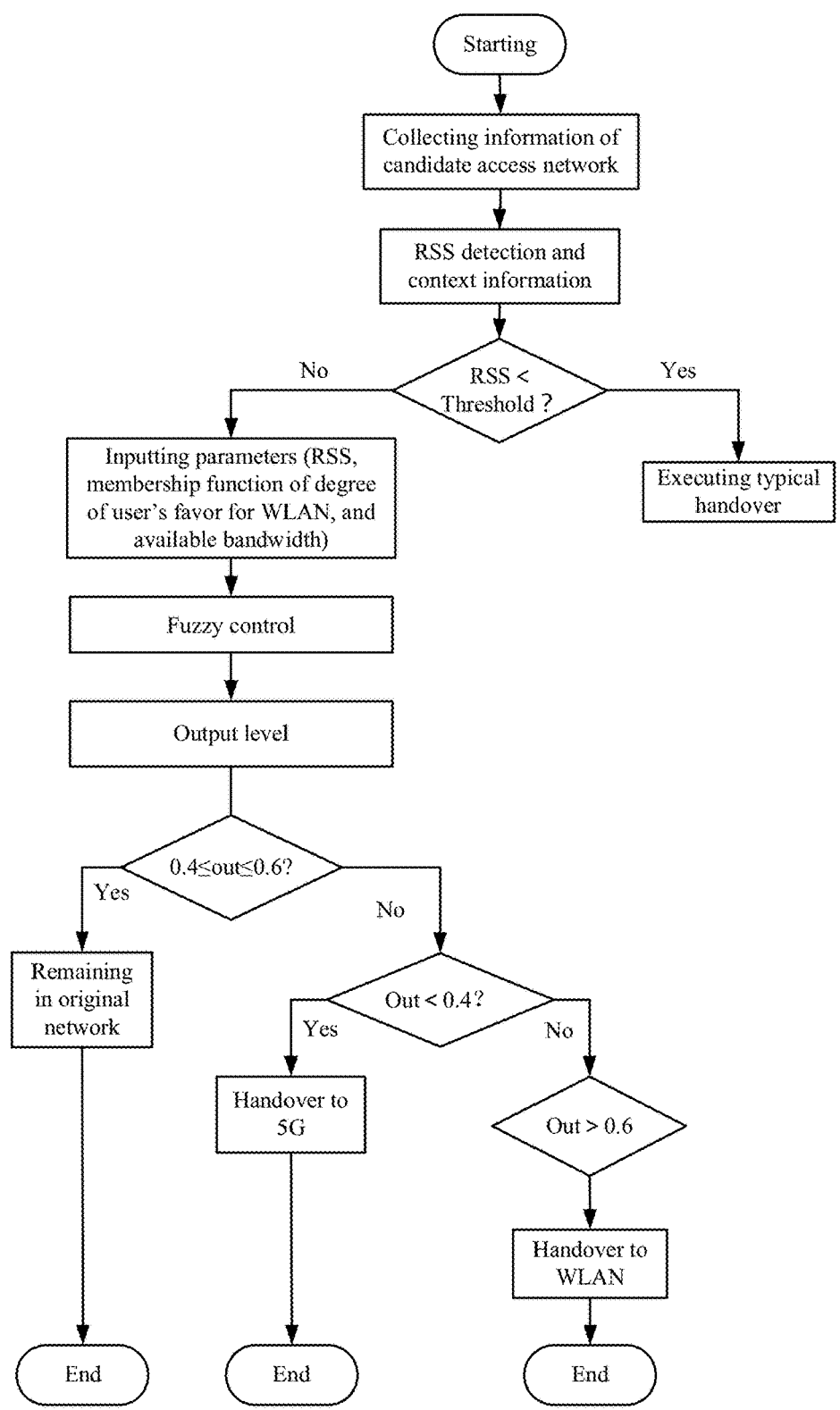
FIG. 5 is a flowchart of the fuzzy-logic-control based VHO-decision mechanism in accordance with the one embodiment of the invention.

As shown in FIG. 5, the fuzz-logic based 5G/WLAN VHO method according to the invention specifically comprises the following steps:

1) A MN obtains dynamic access-network information from database of ANDSF, and the information is not pre-stored static information but new dynamic information obtained from interaction of HSS with ANDSF through a newly added interface S0 between ANDSF and HSS;

2) If all of received signal strength, available bandwidth, QoS, distance, costs, battery level and moving speed, etc. are taken as evaluation metrics, the proposed handover algorithm would be of high degree of complexity, resulting in increased system load, slowed processing speed and hence increased hardware requirements; therefore, the choice of input parameters is particularly important. So far, there is still no literature which brings up quantitative analysis on choice of parameters.

System performance parameters directly related to RSS (received signal strength) include: SNR (Signal to Noise Ratio at receiver end), SIR (Signal to Interference power Ratio) and SINR (Signal to Interference Noise power Ratio), etc. Typically, a larger RSS indicates a higher SNR or the like parameter. Considering that RSS has encompassed considerations of SNR and other above-mentioned parameters, RSS should be adopted as a decision metric.

Call blocking rate and outage probability of a communication system are important indicators of the system performance Some studies on VHO algorithms also adopt call blocking rate as one of the main considerations. In a cellular network, insufficient available bandwidth of a system is the main reason for occurrence of call blocking rate and outage probability. In WLAN, when number of users is large whereas system bandwidth resources are scarce, competition mechanism in MAC (Media Access Control) layer will cause blocking of users' calls, business interruption and call delay, etc. Since system available bandwidth fully reflects current traffic load of system with respect to total capacity of system, it to some extent determines magnitude of call blocking rate and outage probability of the system. Therefore, in VHO algorithm design, if system available bandwidth is adopted as one of input parameters, then it has encompassed considerations of call blocking probability and outage probability and other like parameters.

In the future, there will be tremendous coverage of 5G network, therefore, assuming that a MN is always within a coverage area of 5G network and 5G network signals always exist, the MN can successfully execute HO from WLAN to 5G network at any time, thus the VHO decision problem becomes an issue whether a user in 5G network needs handover to WLAN. In some cases, even when a user is in a coverage area of WLAN and at the same time the WLAN can provide good quality of service, the user however may not want to choose WLAN. There are a variety of reasons for that: the user may not want to cause loss of data packets in HO procedure, or the user dislikes the time delay brought by HO procedure, or the user dislikes the security issue brought by HO procedure, or the user himself has no particular favor for WLAN, etc.; in a word, a user has right not to select WLAN, as long as the original network meets their current needs. Therefore, the degree of UF for WLAN must be adopted as a factor to be considered in HO decision.

In consequence, the invention selects, from the dynamic information obtained by the approach described above, three variables, namely, received signal strength, available bandwidth and degree of UF for WLAN, for fuzzification processing.

3) The VHO-decision procedure firstly detects whether there are mandatory user-defined rules (in the case of a time critical service where RSS is below the threshold), if it is true, then a typical HO is executed directly according to the user-defined rules, otherwise the VHO-decision procedure enters into a fuzz-logic based mode;

4) The real-time collected performance parameters are input into a fuzzification module for information fuzzification processing: the RSS, available bandwidth, and degree of UF are respectively defined as a domain ranging from 0 to 1, with three fuzzy subsets defined over the domains respectively, so as to convert input exact values into fuzzy variable values represented by membership functions;

5) A fuzzification inference module performs multi-aspect evaluation of the input fuzzy subsets according to "If . . . Then . . . " fuzzy rules, and thus obtains an aggregation of fuzzy-decision outputs;

6) A defuzzification module converts the aggregation of fuzzy-decision outputs into a certain numeric value according to a defuzzification formula, in which a Sugeno-type fuzzy control system is utilized to output a certain numeric value, and according to the certain numeric value, determines whether HO is performed to candidate access network or staying in the original network. If the output out is less than 0.4, indicating that at this time it is best for the MN to select 5G network; If the output out is greater than 0.6, indicating that at this time it is best for the MN to select WLAN; If the output out is between 0.4 and 0.6, the MN stays in the original network, and with such mechanisms, HO frequency can be reduced, thus avoiding ping-pong HO effect which would otherwise deteriorate HO performance;

7) The MN conducts adjustment and control by dynamically updating access-network information, changing rules and varying membership functions, thus accomplishing multi-times of HO.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of 5G/WLAN vertical handover based on fuzzy logic control, the method comprising:
   1) obtaining, by a mobile node, dynamic access-network information from a database of access network discovery and selection function, wherein the dynamic access-network information is obtained from interaction of access network discovery and selection function with home subscriber register through a newly added interface S0 between access network discovery and selection function and home subscriber register;
   2) from the obtained dynamic access-network information, sorting out and selecting a received signal strength, an available bandwidth, and a degree of user's preference for WLAN as performance parameters, and monitoring a real-time status of networks;
   3) when the real-time status of the networks satisfies mandatory user-defined rules, executing a typical handover directly according to the user-defined rules; when the real-time status of the networks does not satisfy mandatory user-defined rules, triggering a vertical handover-decision procedure based on a fuzz logic mode:
      3.1) inputting real-time collected performance parameters into a fuzzification module for fuzzification processing: defining domains ranging from 0 to 1 for the received signal strength, the available bandwidth, and the degree of user's preference, respectively, defining three fuzzy subsets over each of the domains, and converting input exact values into fuzzy variable values represented by membership functions;
      3.2) performing, by a fuzzification inference module, multi-aspect evaluation of the three fuzzy subsets according to "If . . . Then . . . " fuzzy rules to obtain an aggregation of fuzzy-decision outputs; and
      3.3) converting, by a defuzzification module, the aggregation of fuzzy-decision outputs into a certain numeric value according to a defuzzification formula, and comparing the certain numeric value with a previously obtained threshold, determining to which candidate access network the handover is to be performed to accomplish one-time of handover procedure; and
   4) conducting adjustment and control, by the mobile node, by dynamically updating access-network information, changing rules and varying membership functions;
wherein:
   the defuzzification module converts the fuzzy outputs into a certain numeric value according to a defuzzification formula, and the defuzzification process employs a center-of-gravity approach and generates an output as follows:

$$\text{out} = \frac{\sum_{j=1}^{27}\left(\text{output}_j \prod_{i=1}^{3} u_{ij}\right)}{\sum_{j=1}^{27}\left(\sum_{i=1}^{3} u_{ij}\right)}$$

wherein $\text{output}_j$ is an output of a jth rule, $u_{ij}$ is an ith degree of membership of the jth rule.

2. The method of claim 1, wherein:
   the received signal strength, available bandwidth, and degree of user's preference are respectively defined as a domain ranging from 0 to 1, with three fuzzy subsets defined over the domains respectively:
   for received signal strength, "0" in the domain indicates that the received signal strength at the receiver end is less than or equal to the minimum threshold, "1" in the domain indicates that the received signal strength is greater than or equal to the maximum threshold, and "0.5" is for the rest cases;
   for available bandwidth, "0" indicates that the available bandwidth is less than or equal to Min(i), "1" indicates that the available bandwidth is greater than or equal to Max(i), and "0.5" is for the rest cases; and
   for degree of user's preference, "0" indicates that the WLAN is not to be chosen by the user in any cases, "1" indicates that the WLAN is favored by the user, and "0.5" indicates a normal degree of favor.

* * * * *